Patented May 21, 1929.

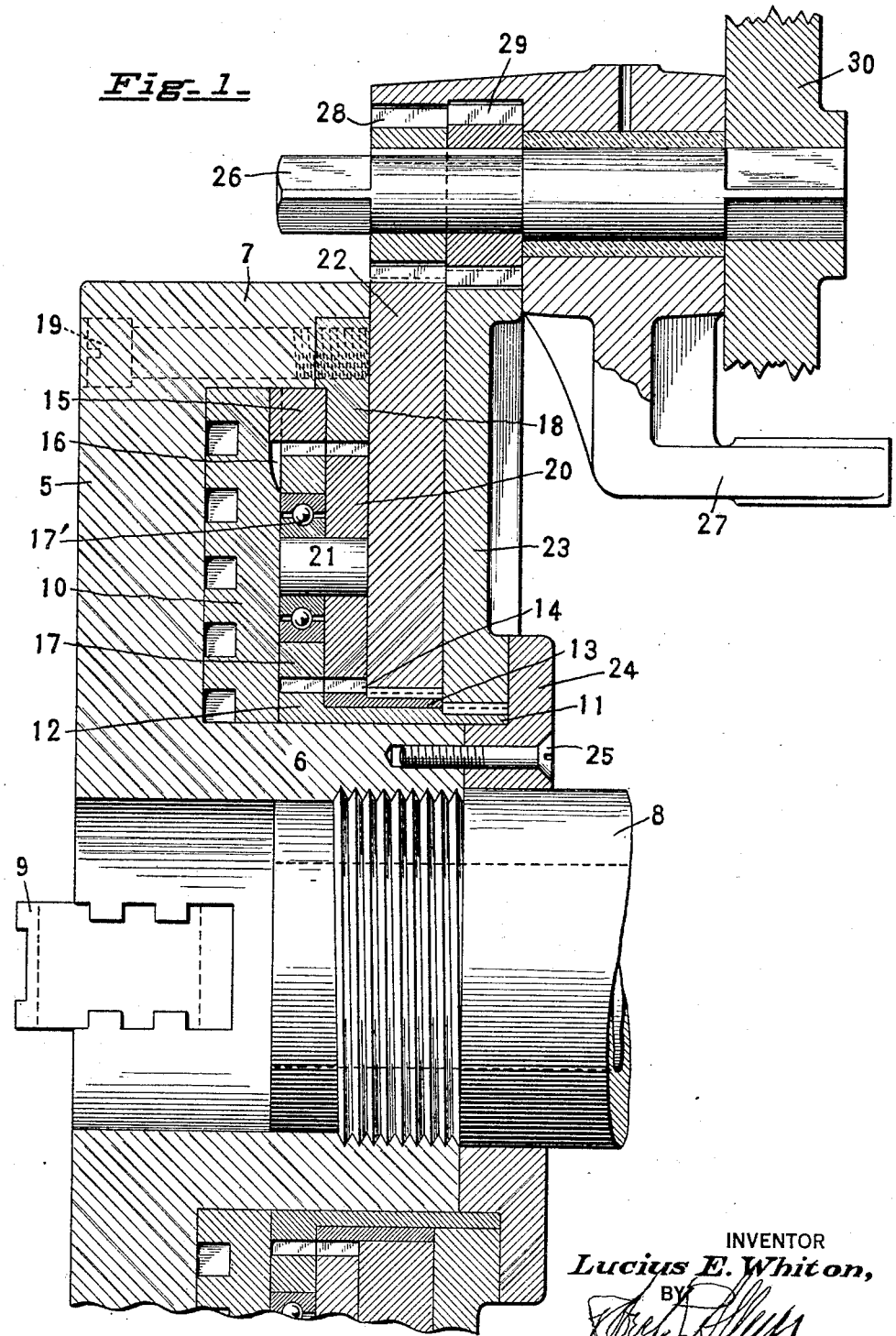

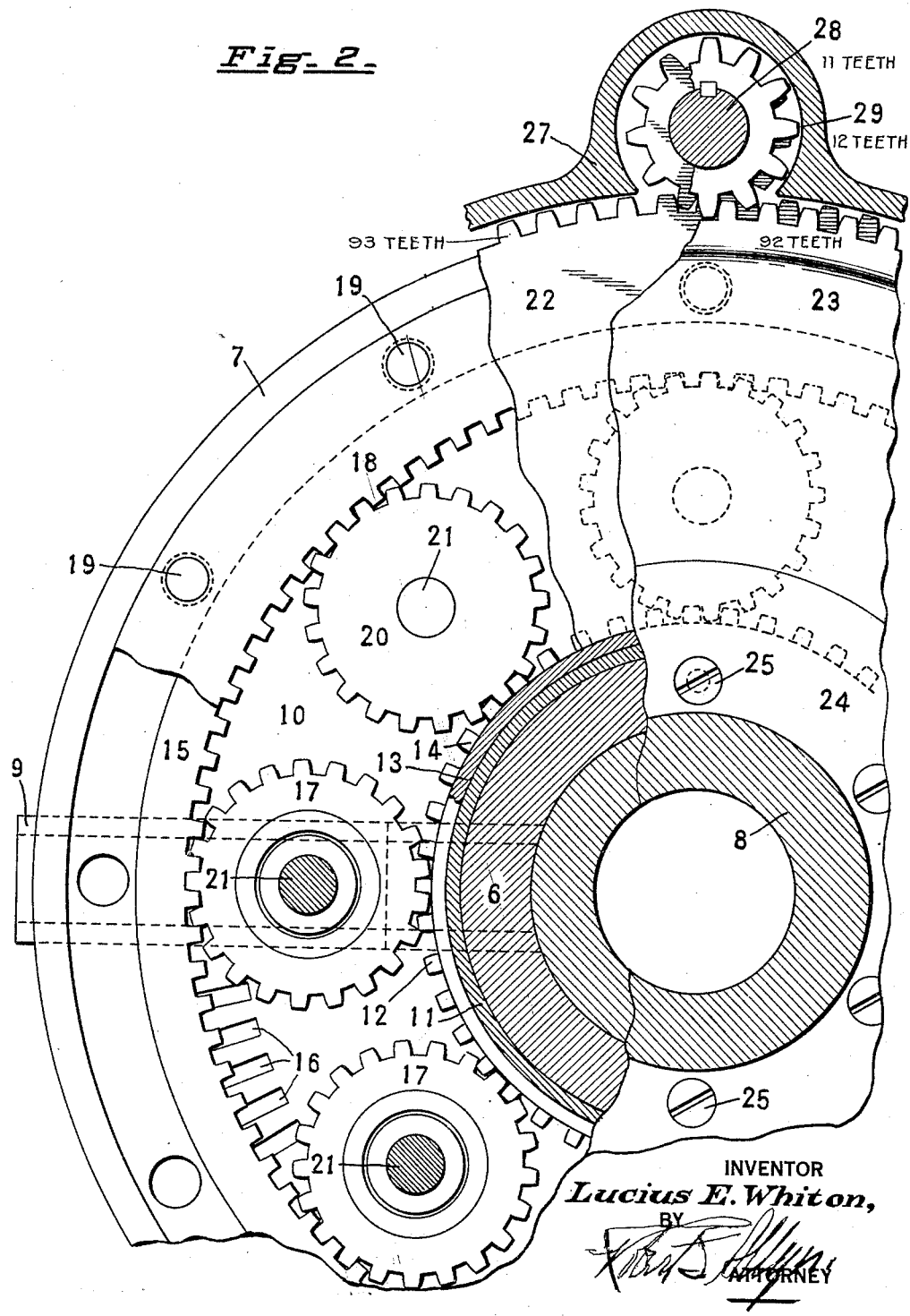

1,713,800

UNITED STATES PATENT OFFICE.

LUCIUS E. WHITON, OF NEW LONDON, CONNECTICUT.

AUTOMATIC CHUCK.

Application filed April 10, 1926. Serial No. 101,043.

My invention relates particularly to what are termed lathe chucks.

The main object is to provide a powerful, compact, and reliable construction which can be adjusted to grip or release the stock while the chuck is rotating.

Under modern developments of high speed machines and tools, the problem of chuck design has come to be very difficult not only because of the high speed operations required but because of the limitations of space within which the chuck mechanism must be confined. It has, therefore, become increasingly important to provide the greatest possible power factor within the very limited space available for chuck construction.

In applications heretofore filed by me #61,173 filed Oct. 8, 1925, and #77,933 filed Dec. 28, 1925, I have disclosed constructions marking forward steps in this art in which means is provided for adjusting the chuck jaws while the chuck is in motion and in which the power applied is distributed over a relatively large number of tooth engagements with reduction of pressure per tooth or of added power to withstand the wear resulting from such increased pressures.

In the present case I have incorporated differential mechanism between the variator and the jaw adjusting member whereby the relative movement is very greatly reduced, or, which is substantially the same thing, the power factor incorporated within the chuck mechanism is very greatly increased. This has been accomplished in the form which will be hereinafter described by employing a relatively movable abutment in conjunction with a variator and driving both of these members but at different speeds.

Fig. 1 is a longitudinal sectional view of a chuck embodying one form of the improvements of my present invention, part of the chuck being broken away and showing the differential driving mechanism.

Fig. 2 is a rear view and vertical section of the same, parts being broken away to show the various elements.

The chuck body 5 has a hub 6 and a rim 7. The chuck is adapted to be secured in any suitable manner to the spindle 8 which may be hollow to permit the passage of the stock to be operated upon or the operation of cutting tools. Any number and type of jaws such as 9 may be used and they may be adjustable back and forth across the face of the chuck body, as is customary in tools of this character. In the form shown, I have provided a scroll or cam plate 10 which is rotatable within the chuck body and provided with a scroll thread of the usual character engaging the jaws or jaw bases so that as the scroll plate is rotated with respect to the chuck body, the jaws are moved in or out as the case may be. This particular construction, as will hereinafter be understood, makes it possible to utilize an extra heavy thread on the scroll plate, thus increasing the strength and durability of the device.

In the rear of the scroll plate or jaw adjusting member I mount a sleeve 11 which is rotatable on the hub 6 and is provided with gear teeth 12 on the end adjacent plate 10. On this sleeve 11 is mounted another sleeve 13 which is rotatable with respect to the sleeve 11 and provided with gear teeth 14 corresponding to the teeth 12 on the sleeve 11. Opposite the gear 12 I mount an annular gear ring 15 which is adapted to travel inside of the flange 7 of the chuck body. This gear ring 15 is connected in some suitable manner to the plate 10, preferably and simply by means of clutch teeth which fit into corresponding grooves 16 in the rear face of plate 10 so that the plate and gear ring rotate together but can be readily separated. Between the gears 12 and 15 I mount a series of pinions 17 which are adapted to travel around against the rear face of the plate 10. An annular gear ring 18, having teeth corresponding to the teeth on the gear ring 15, is secured to the flange 7 of the chuck body in a suitable manner, as, for instance, by means of screws 19. Between the gears 14 and 18 I mount a series of pinions 20 corresponding to the pinions 17. These pinions 17 and 20 are arranged in pairs and each pair mounted on a short stud or shaft 21 so that the pinions of the pair rotate independently with respect to the axis of the pair, but so that the two pinions of each pair are compelled to travel bodily together in the space between the inner gears 12 and 14 and the larger gears 15 and 18.

After the parts thus far described have been assembled, the two gear wheels 22 and 23 are successively applied and keyed to the sleeves 13 and 11, respectively, and the ring 24 secured to the rear of the chuck body by means of a series of screws 25. This completes what may be termed the chuck proper, which is but little larger than an ordinary chuck and yet is capable of automatic adjustment while in motion.

The counter-shaft or spindle 26 is mounted in a suitable bearing in some stationary part of the machine, as, for instance, a bracket 27 adapted to be secured to the head stock of the lathe. This shaft 26 carries two pinions 28 and 29 which mesh, respectively, with the teeth of the gear wheels 22 and 23. These gear wheels 22 and 23 and the pinions 28 and 29 are so designed as to provide for a differential action when the shaft 26 is rotated. For instance, the gear member 22 which corresponds to the fixed or abutment member in some of my former applications, may have 93 teeth to be actuated by pinion 28 having 11 teeth. The variator 23 or operating member may have 92 teeth and be driven in turn by a pinion 29 having 12 teeth. The result is that when the shaft 26 is driven, not only is the variator 23 driven at a lower speed than the shaft 26 but the disc or plate gear member 22 is driven at a speed which is only slightly less than that of the variator 23. The shaft 26 may be turned by means of a keyed or socket wrench on the front end or it may be rotated by means of a gear or power driven member 30 at the rear.

Normally, of course, the shaft 26 and the gear wheels 22 and 23 are stationary so that when the chuck is rotated, the annular gears 15 and 18 rotate around the stationary gears 12 and 14 carrying with the chuck body the pairs of planetary pinions 17—20 which are guided between the rear of the scroll plate 10 and the front of the abutment plate 22. When the shaft 26 is rotated, the differential gear train above described produces relative rotative movement of the sleeve 11 and its gear 12 with respect to the sleeve 13 and its gear 14. This causes rotation of each pinion 17 with respect to the corresponding pinion 20 and thus drives the gear ring 15 and the jaw adjusting plate 10 with respect to the gear ring 18 and the chuck body. This arrangement results in a power factor more than ten times greater than the power factor which would be available were the abutment 22 actually stationary or fixed, as set forth in some of my said applications. This change of construction also eliminates the necessity of mounting the member 22 on the lathe head stock and greatly simplifies the assembly of the parts.

It should be understood, of course, that this same principle of construction is applicable to other chucks beside the particular one herein shown. It will also be understood that the direction of rotation of the member 10 is determined by the relative speed of rotation of the members 22 and 23, which is readily controllable in the design.

This new arrangement affords an extreme possibility of design to suit various requirements and at the same time permits the use of parts amply strong to resist enormously increased gripping pressures required in modern practice.

I claim:

1. A lathe chuck comprising two normally stationary plates arranged next to each other, a chuck body having jaws, an adjustor for said jaws, a spur gear connected to each of said plates, normally rotatable annular gears connected to said body and to said adjustor respectively and having interior teeth, pairs of planetary gears, each pair being on a common shaft and adapted to travel between said spur gears and said annular gears and means for rotating both of said plates and their spur gears but at differential speeds.

2. The combination of two concentrically mounted relatively rotatable members, one of said members having a hub and a flange, annular gears secured to the outer edges of said members, a sleeve mounted on said hub and having a gear within one of said annular gears, a second gear mounted on said sleeve within the other annular gear, a pair of pinions having a common shaft and interposed between said outer and inner gears, a plate connected to one of said inner gears and holding said pinions in place and means for rotating said inner gears at different speeds.

3. A chuck comprising two concentrically mounted relatively rotatable members, two annular gears having interior teeth, one of said gears having clutch toothed coupling with one of said members and screws for securing the other gear to the other member, two spur gears arranged inside of said annular gears, pairs of connected pinions meshing with said outer and inner gears, the pinions of each pair being supported independently of the other pairs and means for rotating both of said inner gears independently of the relatively rotatable members.

4. The combination of two concentrically mounted relatively rotatable members, one of said memers having a hub, an annular gear connected with one of said members, a second annular gear fastened to the other member and overlapping the first gear, a gear within one of said annular gears, a second gear mounted within the other annular gear, a pair of pinions having a common shaft and interposed between said outer and inner gears, a plate connected to one of said inner gears and forming a bearing surface for said pinions and for one of said annular gears, and means for rotating said inner gears.

5. A construction of the character described comprising two concentrically mounted relatively rotatable members, two annular gears rotatable with said members and arranged with interior teeth side by side in contact with each other, two spur gears arranged in contact with each other inside of said annular gears, pairs of connected pinions meshing with said outer and inner gears, the pinions of each pair being supported on a shaft in contact with each other and each pair being supported independently of the other pairs and means for rotating said spur gears at different speeds and independently of the relatively rotatable members.

6. In a chuck a body, a jaw operating plate mounted therein, a sleeve mounted concentrically with said body and having gear teeth arranged adjacent said plate, an annular gear connected to the periphery of said plate, a pinion mounted to travel between said gears, a gear ring mounted on said sleeve adjacent the teeth of said sleeve, an annular gear connected to the periphery of said chuck body alongside of the first mentioned annular gear, a pinion interposed between said gear ring and the second mentioned annular gear, a shaft connecting said pinions, a rotatable plate connected to said gear ring and forming a backing for one of said pinions and one of said annular gears, and a second rotatable plate connected to said sleeve alongside of said first rotatable plate and means for driving said two rotatable plates simultaneously but differentially.

7. In a chuck a body, a jaw operating plate mounted therein, a gear ring mounted concentrically with said body and having gear teeth arranged adjacent said plate, an annular gear connected to the periphery of said plate, a pinion mounted to travel between said gears, a gear ring mounted adjacent the teeth of said gear ring, an annular gear connected to the periphery of said chuck body alongside of the first mentioned annular gear, a pinion interposed between said second gear ring and the second mentioned annular gear, a shaft connecting said pinions, a rotatable gear plate connected to said gear ring and forming a backing for one of said pinions and one of said annular gears, a rotatable gear plate secured to said sleeve alongside of said first gear plate, a bracket, a shaft carried by said bracket, and pinions carried by said shaft for rotating the rotatable gear plates differentially.

8. In a chuck a body, a jaw operating scroll plate coacting therewith, spur gears mounted concentrically with said chuck body, said gears being rotatable, annular gears secured respectively to said chuck body and said jaw operating plate and having interior teeth, planetary pinions mounted to travel between said annular gears and said spur gears, two rotatable gears secured to rotate with said rotatable spur gears, and a shaft geared differently to said rotatable gears.

9. A chuck body having a hub, a scroll plate mounted to rotate within said body on said hub, jaws connected to said plate, an annular gear having interior teeth secured to said scroll plate, a sleeve gear rotatable on said hub, a series of pinions interposed between said gears, an annular gear connected to said body, a second sleeve gear, a rotatable plate secured to said latter gear, a series of pinions interposed between said two last-mentioned gears, shafts connecting the pinions of the two series guided between said rotatable plate and said cam plate, and means for rotating said sleeve gears.

10. A chuck comprising a body, a scroll plate therein, two rotatable plates, outer and inner gears secured to said scroll plate and one of said rotatable plates respectively, a companion gear mounted along side of each of said outer and inner gears and connected to said body and the other rotatable plate respectively, pairs of pinions connecting said gears, each pair being mounted on a shaft and guided solely between adjacent surfaces of said scroll plate and one of said rotatable plates and means for rotating both of said rotatable plates but at different speeds.

11. An automatic chuck comprising a body, a scroll member mounted to rotate therein, jaws connected to said member, an annular gear having a clutch connection with said scroll member, a spur gear rotatable in said body, a sleeve connected thereto, a series of pinions interposed between said gears, a second annular gear overlapping and holding the first annular gear, screws connecting said second annular gear to said body, a gear rotatable on said sleeve, a rotatable plate secured to said latter gear, a series of pinions interposed between said two last-mentioned gears, shafts connecting the pinions of the two series guided between said rotatable plate and said cam member, and means for rotating said plate.

12. In a chuck the combination of two concentrically mounted relatively rotatable members, one of said members having a hub, annular gears secured to said members side by side, a sleeve mounted on said hub and having a gear within one of said annular gears, a second gear mounted on said sleeve within the other annular gear, a pair of pinions having a common shaft and interposed between said outer and inner gears, gear wheels for rotating said inner gears, a countershaft and pinions on said shaft meshing with said gear wheels and having differential ratios.

13. A chuck having the combination of two concentrically mounted relatively rotatable members, one of said members having a hub, annular gears secured to said members side by side, a sleeve mounted on said hub and having a gear within one of said annular gears, a second gear mounted on said sleeve within the other annular gear, a pair of pinions having a common shaft and interposed between said outer and inner gears, a gear plate for rotating one of said inner gears, a gear plate for rotating the other inner gear, and pinions for rotating said gear plates.

14. A chuck comprising a rotatable body having radially movable jaws, a jaw actuating plate within the body, an abutment plate mounted spaced apart from said actuating plate, inner and outer spur gears mounted side by side between said plates, the outer of said gears being connected to said abutment plate, means for rotating said abutment plate, means for rotating the inner gear, annular gears connected to said chuck body and said actuating plate and a pair of planetary pinions mounted on a common shaft and travelling between the annular and spur gears and guided between the actuating plate and the abutment plate.

15. A chuck comprising a body having a hub and a flange and provided with guideways in its outer face and a recess between the hub and flange, jaws adjustable in said guideways, a jaw actuating member in said recess connected to said jaws, annular gears having inwardly projecting teeth and connected respectively to the flange of said body and to the edge of said jaw actuating member, spur gears supported on said hub within said annular gears and having outwardly projecting teeth, planetary pairs of pinions mounted to travel between said annular gears and said spur gears, means for normally holding said spur gears stationary while the chuck body and the jaw actuating member and their connected annular gears are rotating, and means for rotating said spur gears simultaneously but at different speeds.

LUCIUS E. WHITON.